No. 729,054. Patented May 26, 1903.

UNITED STATES PATENT OFFICE.

FRIEDRICH FISCHER AND HUGO GUNTRUM, OF ELBERFELD, GERMANY, ASSIGNORS TO FARBENFABRIKEN OF ELBERFELD CO., OF NEW YORK, N. Y., A CORPORATION OF NEW YORK.

AMIDO-OXYBENZYL SULFONIC ACID.

SPECIFICATION forming part of Letters Patent No. 729,054, dated May 26, 1903.

Application filed February 20, 1903. Serial No. 144,331. (No specimens.)

*To all whom it may concern:*

Be it known that we, FRIEDRICH FISCHER and HUGO GUNTRUM, chemists, residing at Elberfeld, Germany, (assignors to the FARBENFABRIKEN OF ELBERFELD CO., of New York,) have invented a new and useful Improvement in Amido-Oxybenzyl Sulfonic Acid; and we hereby declare the following to be a clear and exact description of our invention.

We have found that a new amido-oxybenzyl sulfonic acid having the formula

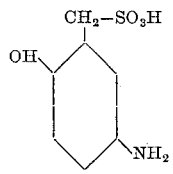

can be obtained by first treating meta-nitro-ortho-oxybenzyl chlorid, having the formula

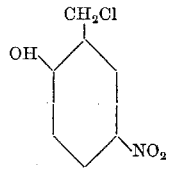

with sulfites and then reducing the resulting meta-nitro-ortho-oxybenzyl sulfonic acid. We have found that the new body thus obtained is of especial value as a photographic developer.

In carrying out the process practically we can proceed as follows, the parts being by weight: ten parts of meta-nitro-ortho-oxybenzyl chlorid (the preparation of which is described in United States Letters Patent No. 696,020, dated March 25, 1902) are added to a solution of 13.4 parts of sodium sulfite in one hundred parts of water and the resulting mixture is allowed to stand for some days on occasionally stirring it from time to time. It is filtered, the filtered liquid is acidulated by means of hydrochloric acid, and the sodium salt of meta-nitro-ortho-oxybenzyl sulfonic acid is precipitated by the addition of common salt. A solution of ten parts of the sodium salt thus produced in twenty parts of water is then boiled with fifteen parts of zinc-dust until the liquid is decolored. It is filtered, and from the filtered solution the new sulfonic acid is precipitated by the addition of hydrochloric acid.

The new body represents, when dry and pulverized, a whitish powder stable in contact with the air, soluble with difficulty in cold and soluble in hot water. It is practically insoluble in ether, alcohol, and acetone and forms salts with alkalies.

The process proceeds in an analogous manner if instead of zinc-dust another reducing agent be employed.

Having now described our invention and in what manner the same is to be performed, what we claim as new, and desire to secure by Letters Patent, is—

The herein-described new meta-amido-ortho-oxybenzyl sulfonic acid having the above-given formula which represents in a free state a whitish powder, stable in contact with the air, soluble with difficulty in cold and soluble in hot water; being practically insoluble in alcohol ether and acetone and forming salts with alkalies, substantially as hereinbefore described.

In testimony whereof we have signed our names in the presence of two subscribing witnesses.

FRIEDRICH FISCHER.
HUGO GUNTRUM.

Witnesses:
OTTO KÖNIG,
J. A. RITTERSHAUS.